(12) United States Patent
Vogel et al.

(10) Patent No.: US 12,722,780 B2
(45) Date of Patent: Sep. 1, 2026

(54) EXTERNAL CARGO ADAPTER FOR USE WITH A ROTORCRAFT

(71) Applicant: AIRBUS HELICOPTERS DEUTSCHLAND GMBH, Donauwörth (DE)

(72) Inventors: Dominik Vogel, Langweid (DE); Stephan Holze, Friedrichsdorf (DE); Alexandru Dinca, Donauwörth (DE); Stefan Salzburger, Augsburg (DE); Christoph Heider, Rain Am Lech (DE); Lukas Bschorr, Amerdingen (DE); Alfonso D'Avino, Augsburg (DE); Juergen Loi, Rain (DE)

(73) Assignee: AIRBUS HELICOPTERS DEUTSCHLAND GMBH, Donauwörth (DE)

( * ) Notice: Subject to any disclaimer, the term of this patent is extended or adjusted under 35 U.S.C. 154(b) by 0 days.

(21) Appl. No.: 18/632,974

(22) Filed: Apr. 11, 2024

(65) Prior Publication Data

US 2025/0026475 A1 Jan. 23, 2025

(30) Foreign Application Priority Data

Jul. 20, 2023 (EP) .................................... 23186704

(51) Int. Cl.
*B64D 1/08* (2006.01)
*B64C 27/26* (2006.01)
*B64D 1/22* (2006.01)

(52) U.S. Cl.
CPC ................. *B64D 1/08* (2013.01); *B64D 1/22* (2013.01); *B64C 27/26* (2013.01)

(58) Field of Classification Search
CPC ........ B64D 1/22; B64D 7/06; B64U 2101/58; B64U 2101/61; B64U 2101/67; A62B 1/06; A62B 1/16
(Continued)

(56) References Cited

U.S. PATENT DOCUMENTS 2,991,960 A * 7/1961 Mcnutt .................... B64D 1/22 244/3
3,176,940 A * 4/1965 Echeverria, Jr. .......... B64C 1/22 244/137.4

(Continued)

FOREIGN PATENT DOCUMENTS

EP 0669277 A1 8/1995
EP 3909580 A1 11/2021
WO 2005039972 A1 5/2005

OTHER PUBLICATIONS

"Helicopter Rescue Techniques: Civilian Public Safety and Military Helicopter Rescue Operations." National Search & Rescue Academy Training Manual. First edition, Oct. 2013. (Year: 2013).*

(Continued)

*Primary Examiner* — Joshua J Michener
*Assistant Examiner* — Michael B. Kreiner
(74) *Attorney, Agent, or Firm* — Brooks Kushman P.C.

(57) ABSTRACT

An external cargo adapter for use with a rotorcraft that comprises at least one carrier station, in particular at least one weapon station, comprising: at least one mounting lug for attachment to the at least one carrier station; at least one cargo carrying ring for connection to a connecting rope adapted for transport of an external cargo; and a connecting member that connects the at least one mounting lug with the at least one cargo carrying ring.

17 Claims, 5 Drawing Sheets

(58) Field of Classification Search
USPC .......................................................... 89/37.19
See application file for complete search history.

(56) References Cited

U.S. PATENT DOCUMENTS 3,265,336 A * 8/1966 Peterson ................... B64C 1/22 294/82.11
4,378,919 A 4/1983 Smith
4,606,517 A * 8/1986 Adams ..................... B64D 1/06 294/82.26
4,673,059 A * 6/1987 Kurtgis .................... H02G 1/02 182/150
5,158,247 A * 10/1992 Ferrier ..................... B64D 1/22 403/322.4
5,417,304 A * 5/1995 Kurtgis .................... B64D 1/22 182/7
5,593,113 A * 1/1997 Cox ......................... B64D 1/22 294/82.26
6,241,185 B1 * 6/2001 Sanderson ............... B64D 7/02 244/118.1
6,543,328 B1 * 4/2003 Plummer .............. F41F 3/0406 89/1.819
6,889,592 B2 * 5/2005 Isker ........................ B64D 7/00 89/1.61
8,292,229 B2 * 10/2012 Pancotti ................... B64D 9/00 244/17.11
8,590,841 B1 * 11/2013 Hall ........................ B66C 23/20 244/137.1
8,646,728 B2 * 2/2014 Schuster .................. B64D 1/22 244/137.4
8,857,754 B2 * 10/2014 Ferrari ................... B64U 10/13 244/2
9,114,876 B1 * 8/2015 Cockell, II ............... B64D 9/00
9,718,548 B2 * 8/2017 Doyle, Jr. ................ B64D 7/04
9,845,154 B2 * 12/2017 Behrens ................... B64D 1/22
9,944,394 B2 * 4/2018 Thomas ................... B64D 1/22
10,023,312 B2 * 7/2018 Repp ...................... H04N 23/63
10,023,313 B2 * 7/2018 Behrens ................... B64D 1/22
10,421,544 B2 * 9/2019 Veronesi ................. B66C 13/18
10,472,065 B2 * 11/2019 Winfree ................... B64D 1/22
10,479,502 B2 * 11/2019 Barbieri ................... B64D 1/22
10,479,503 B2 * 11/2019 Sikora ...................... B64D 9/00
10,549,854 B2 * 2/2020 Chavez ............... B64C 29/0033
10,589,862 B2 * 3/2020 Hainsworth ............. B64D 1/22
10,843,905 B2 * 11/2020 Kale ......................... B66C 7/08
10,858,104 B2 * 12/2020 Maghsoodi .............. B66D 1/54
10,930,182 B2 * 2/2021 Magovern, III ......... B64D 1/22
11,873,099 B2 * 1/2024 Behrens ................ B66C 13/063
11,873,111 B2 * 1/2024 Carr ........................ B60L 50/71
12,297,086 B2 * 5/2025 Maghsoodi .............. B66D 1/36
2004/0216596 A1 11/2004 Isker et al.
2016/0236779 A1 8/2016 Thomas et al.
2018/0111687 A1 4/2018 Thomas et al.
2020/0298974 A1 9/2020 Szarek
2021/0229819 A1 7/2021 Lemke
2022/0169389 A1 6/2022 Foskey

OTHER PUBLICATIONS

Behrens, M. “Human and Non Human External Cargo: Cargo Hook System and Fast Rope System.” Airbus. Dec. 5, 2018. (Year: 2018).*

Badrocke, Michael et al. “Sikorsky/PZL Mielec S-70i: Black Hawk.” Cutaway illustration. 2003. Retrieved from URL <https://i.postimg.cc/bYzJgTxm/Sikorsky-S-70i.jpg> (Year: 2003).*

European Search Report for European Application No. EP 23186704.5, Completed by the European Patent Office, Dated Jan. 4, 2024, 7 pages.

* cited by examiner

EXTERNAL CARGO ADAPTER FOR USE WITH A ROTORCRAFT

CROSS-REFERENCE TO RELATED APPLICATION

This application claims priority to European patent application No. EP 23186704.5 filed on Jul. 20, 2023, the disclosure of which is incorporated in its entirety by reference herein.

TECHNICAL FIELD

The present disclosure is related to an external cargo adapter for use with a rotorcraft that comprises at least one carrier station, in particular at least one weapon station. The present disclosure is further related to a human external cargo transportation arrangement for use with such a rotorcraft, as well as to a human external cargo transportation system.

BACKGROUND

Rotorcrafts which comprise at least one carrier station, in particular at least one weapon station for carrying weapons externally, are well-known. For instance, the documents US 2020/0298974 A1, US 2004/0216596 A1, and EP 3 909 580 A1 illustrate and/or describe such rotorcrafts, which may also be referred to as "attack helicopters".

However, such attack helicopters are usually not equipped for transporting on their outside human and/or non-human external cargo in general. Therefore, for instance human external cargo that should be transported with a given attack helicopter is usually e.g. transported on a landing gear and/or one or more stub wings of the given attack helicopter.

Nevertheless, the document US 2022/0169389 A1 describes an attack helicopter that may be adapted for human external cargo transportation. This attack helicopter comprises a modular deployable external passenger system (MDEPS) that mounts to the bomb release unit (BRU) and air launched effect (ALE) launcher rack of the attack helicopter. More specifically, the MDEPS includes a fully internally stowable external passenger seating unit with a plurality of seats, which is affixed to articulating mounts. The external passenger seating unit may be translated between a first position in which the external passenger seating unit is stowed in a payload bay of the attack helicopter and a second position in which the external passenger seating unit is deployed external to the attack helicopter for accommodating at least one passenger.

The document WO 2005/039972 A2, in turn, describes a rotorcraft with a fuselage and pivotable lateral payload bays mounted thereto. The pivotable lateral payload bays may be used for mounting or transporting guns or ammunition, personnel or troops, or cargo in general. They may also be used for evacuating wounded persons, and so on.

Furthermore, human and/or non-human cargo attachment devices for use with suitably equipped rotorcrafts, which are embodied to permit transport of human and/or non-human external cargo outside of the rotorcraft, are available in a wide range of variations and usually attachable to ropes or cables which may be connected to the rotorcrafts. In general, three different types of human and/or non-human cargo attachment devices are currently available: rigging plates or loops of so-called SPIE (Special Patrol Insertion/Extraction) rigs, personal transport nets, and personal transport platforms, all of which are attachable to associated attachment interfaces such as safety hooks or snap hooks provided at associated ropes or cables of rotorcrafts.

However, none of the above-described human and/or non-human cargo attachment devices is suitable for use with any one of the above-described attack helicopters.

It is, therefore, an object of the present disclosure to enable use of an attack helicopter for human and/or non-human external cargo transportation and, more generally, of a rotorcraft which comprises at least one carrier station, in particular at least one weapon station for carrying weapons externally.

SUMMARY

This object is solved by an external cargo adapter for use with a rotorcraft that comprises at least one carrier station, in particular at least one weapon station, the external cargo adapter. More specifically, according to the present disclosure the external cargo adapter comprises at least one mounting lug for attachment to the at least one carrier station, at least one cargo carrying ring for connection to a connecting rope adapted for transport of an external cargo, and a connecting member that connects the at least one mounting lug with the at least one cargo carrying ring.

Advantageously, the external cargo adapter enables use of the at least one carrier station of the rotorcraft, in particular the at least one weapon station that is conventionally used for carrying weapons, for transport of human and/or non-human external cargo. The external cargo adapter is lightweight and can be carried in the rotorcraft. It may be used without provision of any additional external mechanics on the rotorcraft, such as an additional cargo hook or winch.

In particular, the inventive external cargo adapter is suitable for attachment of comparatively simple and easy to use human external cargo transportation devices and, thus, enables e.g. evacuation of persons out of dangerous areas. Accordingly, a reliable way of evacuating persons from dangerous areas using already existing rotorcraft interfaces may be provided. Thereby, the persons may be picked up with the rotorcraft without a need for landing, which is important for forest areas, unprepared terrain or water.

Preferably, the inventive external cargo adapter is a removable component which is removably attachable to the at least one carrier station via two connector rings. These two rings implement an opening mechanism. The removable component further comprises an attachment for human external cargo. If required, a swivel may also be installed on the removable component. The swivel may e.g. be used for attachment of suitable transporting ropes.

Advantageously, use of the inventive external cargo adapter does not require any fuselage modification and/or modifications to the at least one carrier station, i.e. the at least one weapon station, of the rotorcraft. Accordingly, there is no need for a design change to the rotorcraft. In fact, the external cargo adapter may be attached easily and quickly to the at least one carrier station, i.e. the at least one weapon station, and it may likewise be released easily and quickly, if required.

According to some aspects, the at least one mounting lug comprises an associated lug opening configured for receiving a blocking hook or bar of the at least one carrier station.

According to some aspects, the at least one cargo carrying ring is mounted to the connecting member via a swivel.

According to some aspects, the connecting member is a connecting rail.

The external cargo adapter may further comprise a first mounting lug and a second mounting lug which are spaced apart from each other on the connecting rail.

The first and second mounting lugs and the at least one cargo carrying ring may be mounted to opposite sides of the connecting rail.

Furthermore, a human external cargo transportation arrangement for use with a rotorcraft that comprises at least a first carrier station and a second carrier station, in particular at least a first weapon station and a second weapon station, is provided. The human external cargo transportation arrangement comprises a first external cargo adapter as described hereinabove for attachment to the first carrier station, a second external cargo adapter as described hereinabove for attachment to the second carrier station, a first connecting rope for connection to the first external cargo adapter, and a second connecting rope for connection to the second external cargo adapter. Each one of the first and second connecting ropes is connected to a swivel for connection to at least one first human external cargo attachment rope and one second human external cargo attachment rope.

Advantageously, persons which should be transported as human external cargo with the rotorcraft using the human external cargo transportation arrangement may attach themselves to the rotorcraft over a harness with a swivel in order to allow rotation during flight in order to prevent twisting of the first and second human external cargo attachment ropes and, thus, of the first and second connecting ropes. The swivel may e.g. be positioned on a top end or a bottom end of the first and second connecting ropes. Preferably, more than one swivel is used in the human external cargo transportation arrangement to allow rotation of the human external cargo before and after releasing of one attachment path.

In case of no usage of the human external cargo transportation arrangement, it may be stored inside of the rotorcraft or on one carrier station, i.e. weapon station, in a suitable box that is attachable thereto e.g. using the external cargo adapter described above. In the latter case, all remaining carrier stations, i.e. weapon stations, may be used for transportation of weapons or other stores before a human external cargo operation, which may require two or more external cargo adapters described hereinabove.

Advantageously, the human external cargo transportation arrangement is adapted for creating a redundant connection between the first carrier station and the second carrier station of a rotorcraft. In this redundant connection, if e.g. attachment to the first carrier station fails accidentally or intentionally, for instance due to a defective cargo hook, attachment to the second carrier station still guarantees safety of a respectively transported person. Thus, the applicable FAR regulations for transportation of human external cargo are largely met and the safety of transported persons is increased compared to a transportation on the landing gear or stub wings as described above. With respect to conventional human cargo attachment devices, such as SPIE rigs, the human external cargo transportation arrangement provides for the same level of safety.

In a first illustrative application scenario, two similar loaded ropes implementing the first and second connecting ropes may be attached via the first and second external cargo adapters to the first and second carrier stations, respectively. For instance, the first and second carrier stations are each provided on an associated stub wing of the rotorcraft. Preferably, the first and second connecting ropes are interconnected by means of a swivel. Persons which are to be transported may, thus, attach themselves to the swivel using e.g. a suitable personnel-carrying device system (PCDS) that may also be referred to as "securing harness". Accordingly, two securing harnesses would be used, which implement or comprise the first and second human external cargo attachment ropes that may have different lengths. The swivel enables rotation of the persons which are to be transported during normal operation.

In case of release of one of the first and second external cargo adapters from the first and second carrier stations, the persons which are to be transported switch from two connection points to only one connection point. However, in any case transportation is still possible and rotating movements are still allowed by the swivel. Furthermore, the released one of the first and second external cargo adapters is not lost and still attached via the respective one of the first and second connecting ropes to the swivel.

In a second illustrative application scenario, an improved visibility during flight of the rotorcraft is enabled. More specifically, the first and second connecting ropes may again be attached via the first and second external cargo adapters to the first and second carrier stations, respectively. For instance, the first and second carrier stations are each again provided on an associated stub wing of the rotorcraft. However, in contrast to the first illustrative application scenario, the first and second connecting ropes may now be connected to first and second swivels, respectively. Moreover, first and second redundant ropes may now be attached to the first and second swivels, respectively, and to the first and second external cargo adapters, respectively. In addition, the first and second external cargo adapters may now be interconnected via a safety rope.

Persons which are to be transported may, thus, attach themselves to the first swivel or the second swivel using e.g. a suitable securing harness. The first and second swivels enable rotation of the persons which are to be transported during normal operation.

In case of release of one of the first and second external cargo adapters from the first and second carrier stations, the persons which are to be transported switch again from two connection points to only one connection point. Advantageously, the safety rope ensures after the release a small falling height of the released one of the first and second external cargo adapters in order not to injure the other person upon release.

However, in any case transportation is still possible and rotating movements are still allowed by the first or second swivel. Furthermore, the released one of the first and second external cargo adapters is not lost and still at least attached to the safety rope.

In a third illustrative application scenario, an improved visibility during flight of the rotorcraft is again enabled. More specifically, two so-called Y-ropes implementing the first and second connecting ropes may be attached via a total of four external cargo adapters to four carrier stations, respectively. For instance, first and second carrier stations are provided on an associated stub wing of the rotorcraft, and second and third carrier stations are provided on another stub wing of the rotorcraft. Preferably, the first and second connecting ropes are connected to first and second swivels, respectively. Persons which are to be transported may, thus, attach themselves to the first swivel or the second swivel using e.g. a suitable securing harness. The first and second swivels enable rotation of the persons which are to be transported during normal operation.

In case of release of one of a first and second or third and fourth external cargo adapters from the first and second or third and fourth carrier stations, the persons which are to be transported switch from two connection points to only one connection point. However, in any case transportation is still possible and rotating movements are still allowed by the first and second swivel. Furthermore, the released one of the external cargo adapters is not lost and still attached to an associated one of the two Y-ropes.

Advantageously, after release of one of a first and second or third and fourth external cargo adapters from the first and second or third and fourth carrier stations, the rotorcraft is still symmetrically loaded. Nevertheless, only a single person may be transported on each one of the stub wings and is attached to only one of the stub wings.

According to some aspects, the first and second connecting ropes are connected to a single swivel that attaches the first connecting rope to the second connecting rope.

According to some aspects, the first connecting rope is connected to a first swivel for connection to the second human external cargo attachment rope, and the second connecting rope is connected to a second swivel for connection to the first human external cargo attachment rope. The first swivel is further connected to a first redundant rope provided for connection to the second external cargo adapter, and the second swivel is further connected to a second redundant rope provided for connection to the first external cargo adapter.

The human external cargo transportation arrangement may further comprise a safety rope for connection of the first external cargo adapter with the second external cargo adapter.

According to some aspects, the human external cargo transportation arrangement may comprise a third external cargo adapter as described hereinabove for attachment to a third carrier station of the rotorcraft, and a fourth external cargo adapter as described hereinabove for attachment to a fourth carrier station of the rotorcraft. The first connecting rope is a first Y-rope for connection to the first external cargo adapter and the third external cargo adapter, and the second connecting rope is a second Y-rope for connection to the second external cargo adapter and the fourth external cargo adapter.

Moreover, a human external cargo transportation system is provided. The human external cargo transportation system comprises a rotorcraft with at least one carrier station, in particular at least one weapon station, and a human external cargo transportation arrangement as described hereinabove.

According to some aspects, the rotorcraft comprises a wing arrangement with at least one left-hand side wing and one right-hand side wing. The left-hand side wing comprises at least the first carrier station, and the right-hand side wing comprises at least the second carrier station.

The wing arrangement may be a stub wing arrangement, wherein the left-hand side wing and the right-hand side wing are stub wings.

According to some aspects, the rotorcraft is an attack helicopter.

BRIEF DESCRIPTION OF THE DRAWINGS

Preferred embodiments of the disclosure are outlined by way of example in the following description with reference to the attached drawings. In these attached drawings, identical or identically functioning components and elements are labeled with identical reference numbers and characters and are, consequently, only described once in the following description;

FIG. 4A to FIG. 6C show front views of a human external cargo transportation system according to the present disclosure.

DETAILED DESCRIPTION

Figure 1:
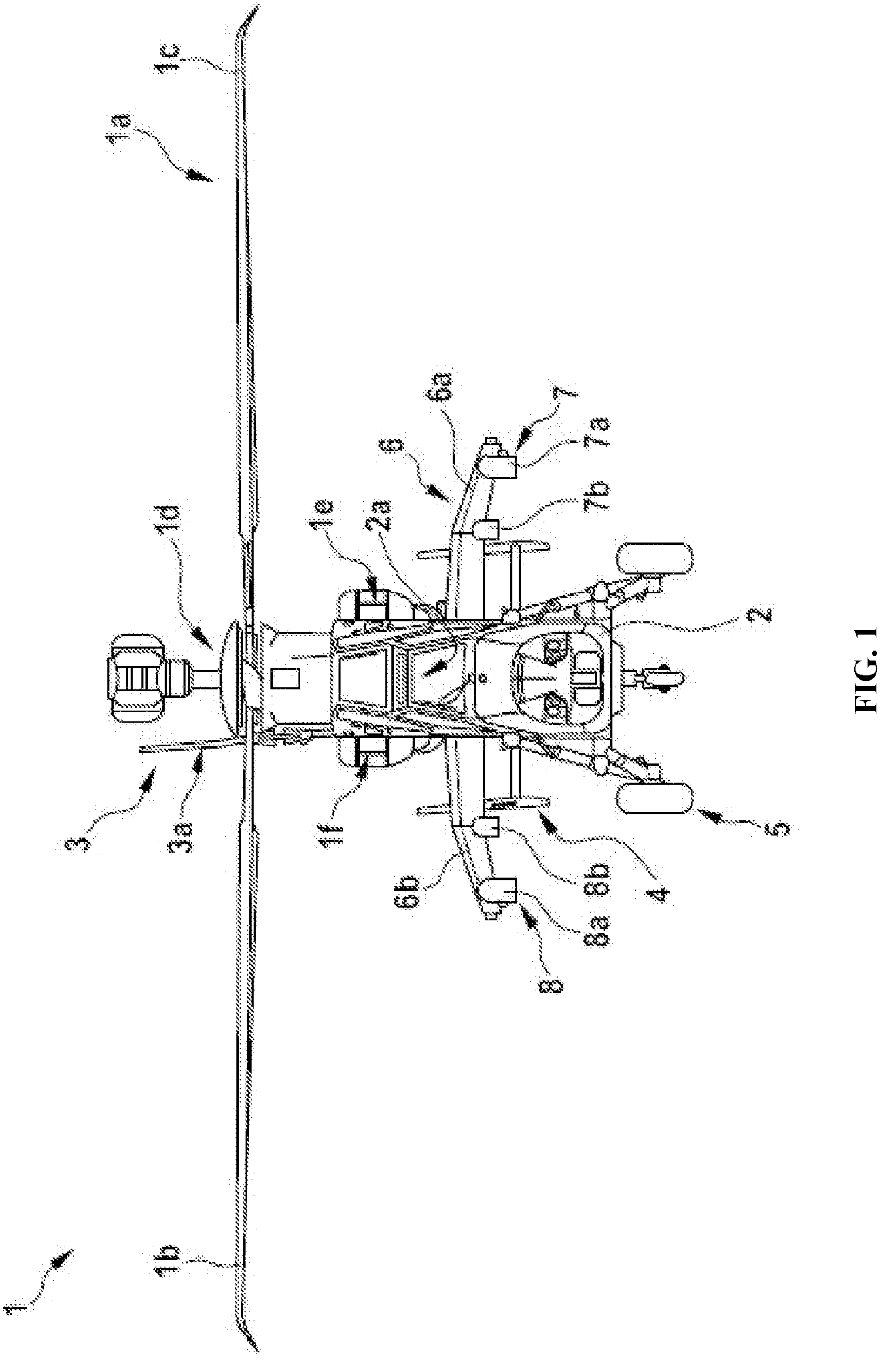
FIG. 1 shows a front view of a rotorcraft with a plurality of carrier stations, in particular a plurality of weapon stations, provided on stub wings of the rotorcraft.

FIG. 1 shows a rotorcraft 1 that is, by way of example, embodied as a helicopter and, more particularly, as a so-called attack helicopter. Thus, for purposes of simplicity and clarity, the rotorcraft 1 is hereinafter referred to as the "attack helicopter 1". The present disclosure is, however, not limited to attack helicopters and may likewise be applied to any other rotorcraft that is adapted for vertical takeoff and landing.

Illustratively, the attack helicopter 1 comprises at least one rotor 1*a* that may be powered by two engines 1*e*, 1*f* for providing lift and forward or backward thrust during operation. By way of example, the at least one rotor 1*a* is a multi-blade main rotor that comprises a plurality of rotor blades which are connected at a rotor head 1*d* to an associated rotor shaft that rotates in operation of the attack helicopter 1 about an associated rotor axis. Two rotor blades of the plurality of rotor blades are illustratively separately labelled with the reference signs 1*b*, 1*c*.

Moreover, the attack helicopter 1 preferably comprises a fuselage 2 to which a landing gear 5 of the wheel-type may be attached. Illustratively, the fuselage 2 forms an aircraft interior region that accommodates at least a cockpit 2*a*.

Furthermore, the attack helicopter 1 preferably comprises at least one counter-torque device 3 configured to provide counter-torque during operation, i.e. to counter the torque created by rotation of the at least one rotor 1*a* for purposes of balancing the attack helicopter 1 in terms of yaw. The at least one counter-torque device 3 is illustratively provided at an aft section of the attack helicopter 1 and preferably comprises a tail rotor 3*a*. The aft section of the attack helicopter 1 may further be provided with a horizontal stabilizer 4. By way of example, the attack helicopter 1 may be provided with a tail boom to which the counter-torque device 3 and the horizontal stabilizer 4 are mounted.

Illustratively, the attack helicopter 1 further comprises a wing arrangement 6. More specifically, the wing arrangement 6 comprises two separate wings 6*a*, 6*b*. The wing 6*a* is a left-hand side wing, seen in forward flight direction of the attack helicopter 1, and the wing 6*b* is a right-hand side wing, seen in forward flight direction of the attack helicopter 1. By way of example, the wing arrangement 6 is a stub wing arrangement, wherein the wing 6*a* is a left-hand side stub wing and wherein the wing 6*b* is a right-hand side stub wing.

Preferably, the stub wing arrangement 6 is equipped with associated carrier stations 7, 8. Illustratively, the left-hand side stub wing 6*a* is equipped with an outboard sub wing carrier station 7*a* and an inboard sub wing carrier station 7*b*, and the right-hand side stub wing 6*b* is equipped with an outboard sub wing carrier station 8*a* and an inboard sub wing carrier station 8*b*.

However, it should be noted that the present disclosure is not limited to provision of the carrier stations 7, 8 as sub wing carrier stations on the stub wing arrangement 6. Alternatively, or in addition, the carrier stations 7, 8 or other suitable carrier stations may e.g. be provided on an underside of the fuselage 2, or they may be attached to the landing gear 5, and so on.

Figure 2:
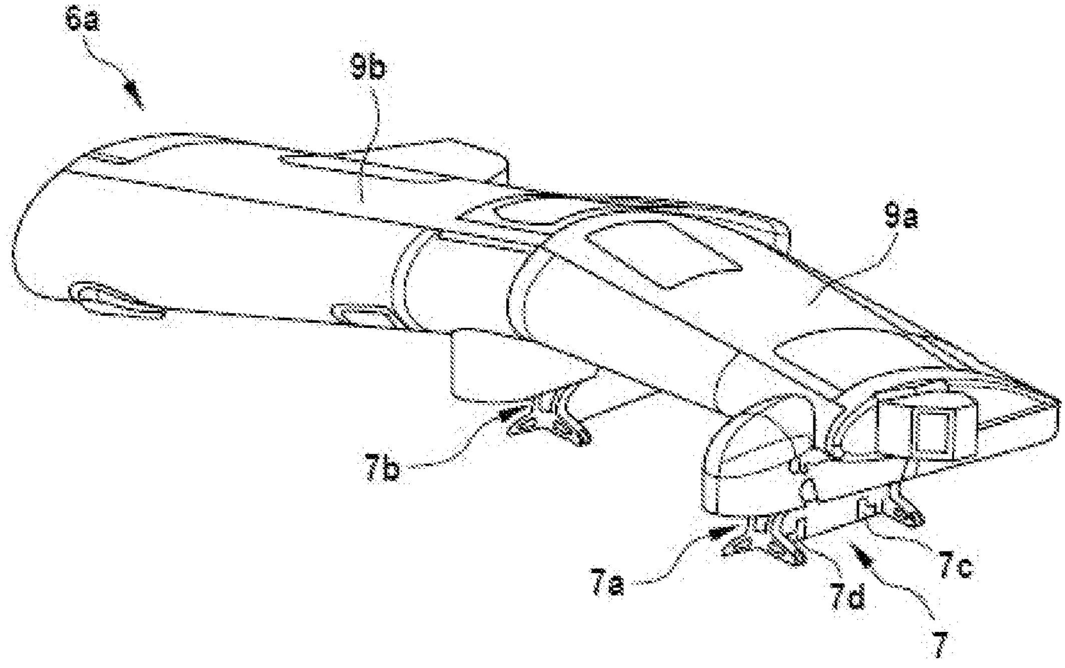
FIG. 2 shows a perspective view of one of the stub wings of FIG. 1 with associated carrier stations.

FIG. 2 shows the left-hand stub wing 6*a* of FIG. 1 with the carrier stations 7 which comprise the outboard sub wing carrier station 7*a* and the inboard sub wing carrier station 7*b* of FIG. 1. Illustratively, the outboard sub wing carrier station 7*a* is mounted to an outboard section 9*a* of the left-hand stub wing 6*a* and the inboard sub wing carrier station 7*b* is mounted to an inboard section 9*b* of the left-hand stub wing 6*a*. By way of example, the outboard sub wing carrier station 7*a* is shown with two blocking hooks or bars 7*c*, 7*d*.

At this point, it should be noted that the outboard sub wing carrier station 7*a* is only shown and explained in more detail representative for all sub wing carrier stations 7*a*, 7*b*, 8*a*, 8*b* of FIG. 1. In other words, each one of the sub wing carrier stations 7*a*, 7*b*, 8*a*, 8*b* of FIG. 1 preferably comprises respective blocking hooks or bars.

It should further be noted that the outboard sub wing carrier station 7*a*, and likewise each other one of the sub wing carrier stations 7*b*, 8*a*, 8*b* of FIG. 1, is preferably embodied as a weapon station which is provided for transportation of weapons or ammunition, but which may e.g. also be used for transportation of additional fuel tanks. Such a weapon station, which may also be referred to as a "bomb rack" or "bomb ejector rack", is, however, well-known to the person skilled in the art so that a detailed description of the weapon stations 7*a*, 7*b*, 8*a*, 8*b* may be omitted, for brevity and conciseness.

Figure 3:
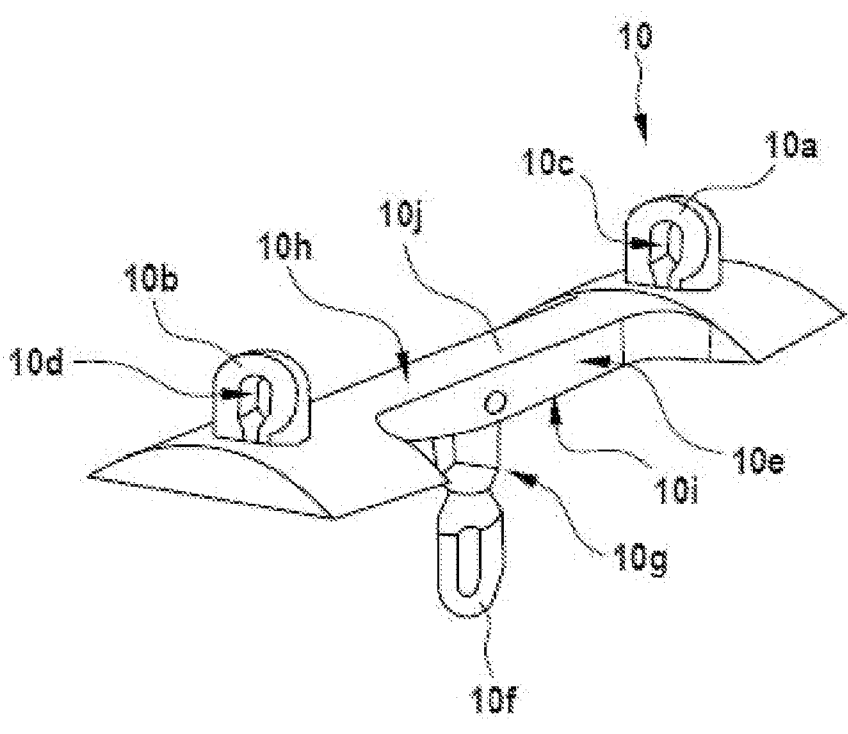
FIG. 3 shows a perspective view of an external cargo adapter for use with one of the carrier stations of FIG. 2, according to the present disclosure.

FIG. 3 shows an external cargo adapter 10 according to the present disclosure. The external cargo adapter 10 is provided for use with a rotorcraft that comprises at least one carrier station, in particular at least one weapon station, such as e.g. the attack helicopter 1 of FIG. 1. More specifically, the external cargo adapter 10 is preferably suitable for transportation of human and/or non-human external cargo.

The external cargo adapter 10 comprises at least one mounting lug for attachment to an associated carrier station, e.g. one of the sub wing carrier stations 7*a*, 7*b*, 8*a*, 8*b* of FIG. 1. By way of example, two mounting lugs 10*a*, 10*b* are provided, which may e.g. be blocked at the carrier station 7*a* of FIG. 2 via the blocking hooks or bars 7*c*, 7*d*. Therefore, each one of the two mounting lugs 10*a*, 10*b* preferably comprises an associated lug opening 10*c*, 10*d* configured for receiving e.g. one of the blocking hooks or bars 7*c*, 7*d*.

The external cargo adapter 10 further comprises at least one and, illustratively, exactly one cargo carrying ring 10*f*. The cargo carrying ring 10*f* is provided for connection to at least one connecting rope (e.g. connecting ropes 12*a*, 12*b* in FIG. 4 and FIG. 5, or 16*a*, 16*b* in FIG. 6) adapted for transport of an external cargo.

The cargo carrying ring 10*f* and the two mounting lugs 10*a*, 10*b* are connected to each other via a connecting member 10*e*. Preferably, the cargo carrying ring 10*f* is mounted to the connecting member 10*e* via a swivel 10*g*. By way of example, the connecting member 10*e* is a connecting rail 10*j*.

Illustratively, the two mounting lugs 10*a*, 10*b* and the cargo carrying ring 10*f* are mounted to opposite sides 10*h*, 10*i* of the connecting rail 10*j*. Furthermore, the two mounting lugs 10*a*, 10*b* are preferably spaced apart from each other on the connecting rail 10*j*.

Figures 4A, 4B, 4C:
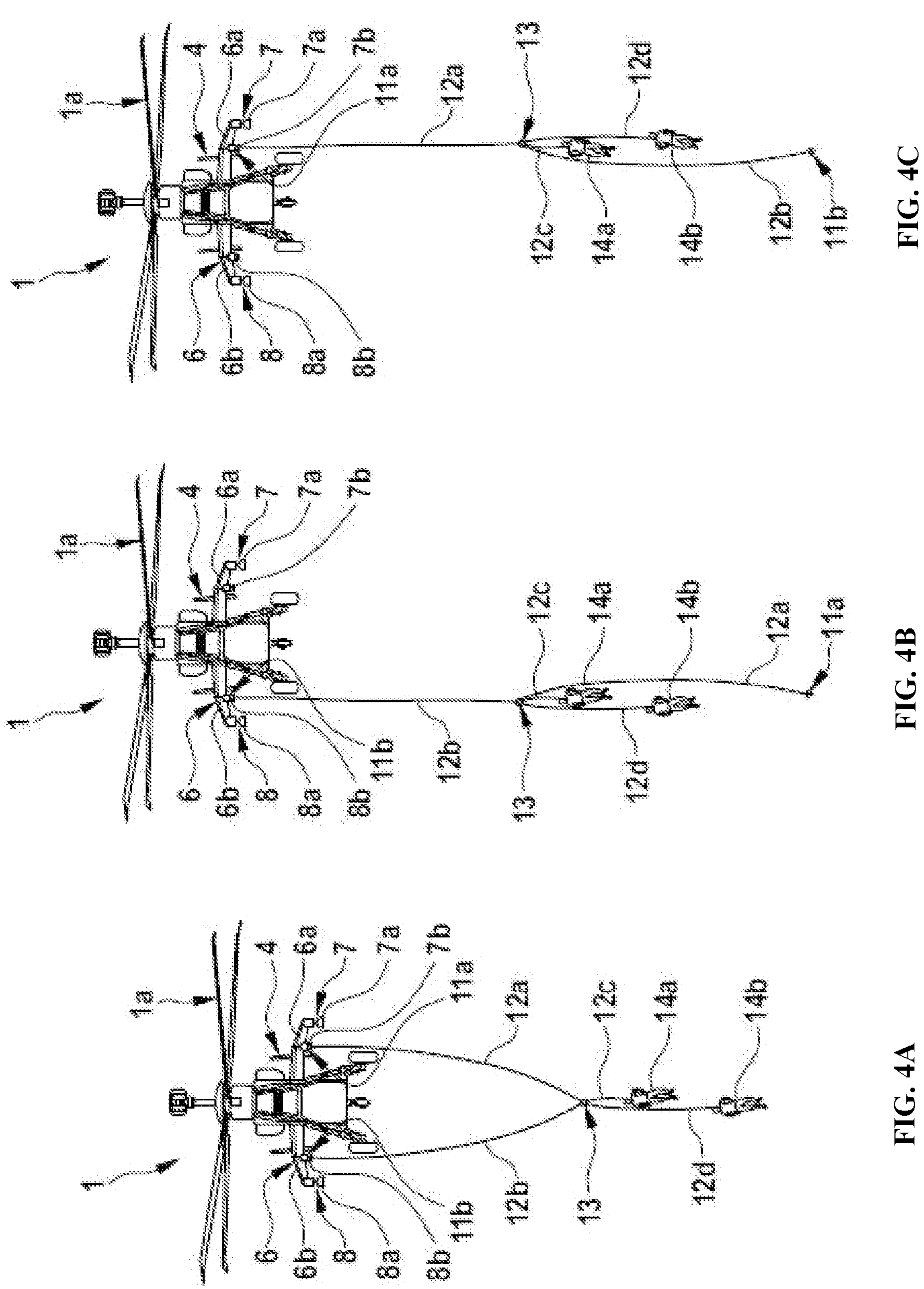

FIG. 4 shows in parts (A) to (C) a human external cargo transportation system according to the present disclosure. The human external cargo transportation system comprises a rotorcraft with at least one carrier station, in particular at least one weapon station, and a human external cargo transportation arrangement.

By way of example, the rotorcraft is the attack helicopter 1 of FIG. 1 with the carrier stations 7, 8. As described above, the carrier stations 7, 8 comprise the sub wing carrier stations 7*a*, 7*b*, 8*a*, 8*b* of FIG. 1 which are embodied as described above at FIG. 2 and arranged on the left-hand side stub wing 6*a* and the right-hand side stub wing 6*b* of the stub wing arrangement 6 of the attack helicopter 1, respectively.

According to part (A), the human external cargo transportation arrangement comprises a first external cargo adapter 11*a* for attachment to a first carrier station, and a second external cargo adapter 11*b* for attachment to a second carrier station. Each one of the external cargo adapters 11*a*, 11*b* is preferably embodied in accordance with the external cargo adapter 10 of FIG. 3.

Illustratively, the external cargo adapter 11*a* is attached to the sub wing carrier station 7*b* and the external cargo adapter 11*b* is attached to the sub wing carrier station 8*b*. Thus, the sub wing carrier stations 7*a*, 8*a* are kept free and may, for instance, still be used for transportation of weapons, ammunition, or additional fuel tanks.

The human external cargo transportation arrangement further comprises a first connecting rope for connection to the external cargo adapter 11*a*, and a second connecting rope for connection to the external cargo adapter 11*b*. Illustratively, a first connecting rope 12*a* is attached to the external cargo adapter 11*a*, and a second connecting rope 12*b* is attached to the external cargo adapter 11*b*.

Furthermore, the connecting ropes 12*a*, 12*b* are both connected to a common swivel 13 which, thus, connects the connecting rope 12*a* with the connecting rope 12*b*. The common swivel 13 is provided for connection to at least one first human external cargo attachment rope and one second human external cargo attachment rope. By way of example, a first human external cargo attachment rope 12*c* and a second human external cargo attachment rope 12*d* are attached to the common swivel 13.

Illustratively, a first person 14*a* is attached as human external cargo to the human external cargo attachment rope 12*c* and a second person 14*b* is attached as human external cargo to the human external cargo attachment rope 12*d*. The persons 14*a*, 14*b* may, for instance, be equipped with individual securing harnesses which are provided with, or attached to, the human external cargo attachment ropes 12*c*, 12*d*. However, such securing harnesses are well-known to the person skilled in the art so that a detailed description thereof can be omitted, for brevity and conciseness.

In part (A) of FIG. 4, the human external cargo transportation system is shown in normal operation mode during flight of the attack helicopter 1. Accordingly, both external cargo adapters 11*a*, 11*b* are correctly attached to the sub wing carrier stations 7*b*, 8*b*.

Part (B) shows a scenario, in which the external cargo adapter 11*a* is accidentally or intentionally released from the sub wing carrier station 7*b*. In this scenario, the external cargo adapter 11*a* falls down by gravity below the two persons 14*a*, 14*b*, but is not lost and, instead, still attached to the common swivel 13 via the connecting rope 12*a*. In particular, both persons 14*a*, 14*b* are still attached via the human external cargo attachment ropes 12*c*, 12*d*, the common swivel 13, the connecting rope 12*b*, and the external cargo adapter 11*b* to the sub wing carrier station 8*b* so that a further safe transportation is guaranteed.

Part (C), in turn, shows a scenario, in which the external cargo adapter 11*b* is accidentally or intentionally released from the sub wing carrier station 8*b*. In this scenario, the external cargo adapter 11*b* falls down by gravity below the two persons 14*a*, 14*b*, but is not lost and, instead, still attached to the common swivel 13 via the connecting rope 12*b*. In particular, both persons 14*a*, 14*b* are still attached via the human external cargo attachment ropes 12*c*, 12*d*, the common swivel 13, the connecting rope 12*a*, and the external cargo adapter 11*a* to the sub wing carrier station 7*b* so that a further safe transportation is guaranteed.

Figures 5A, 5B, 5C:
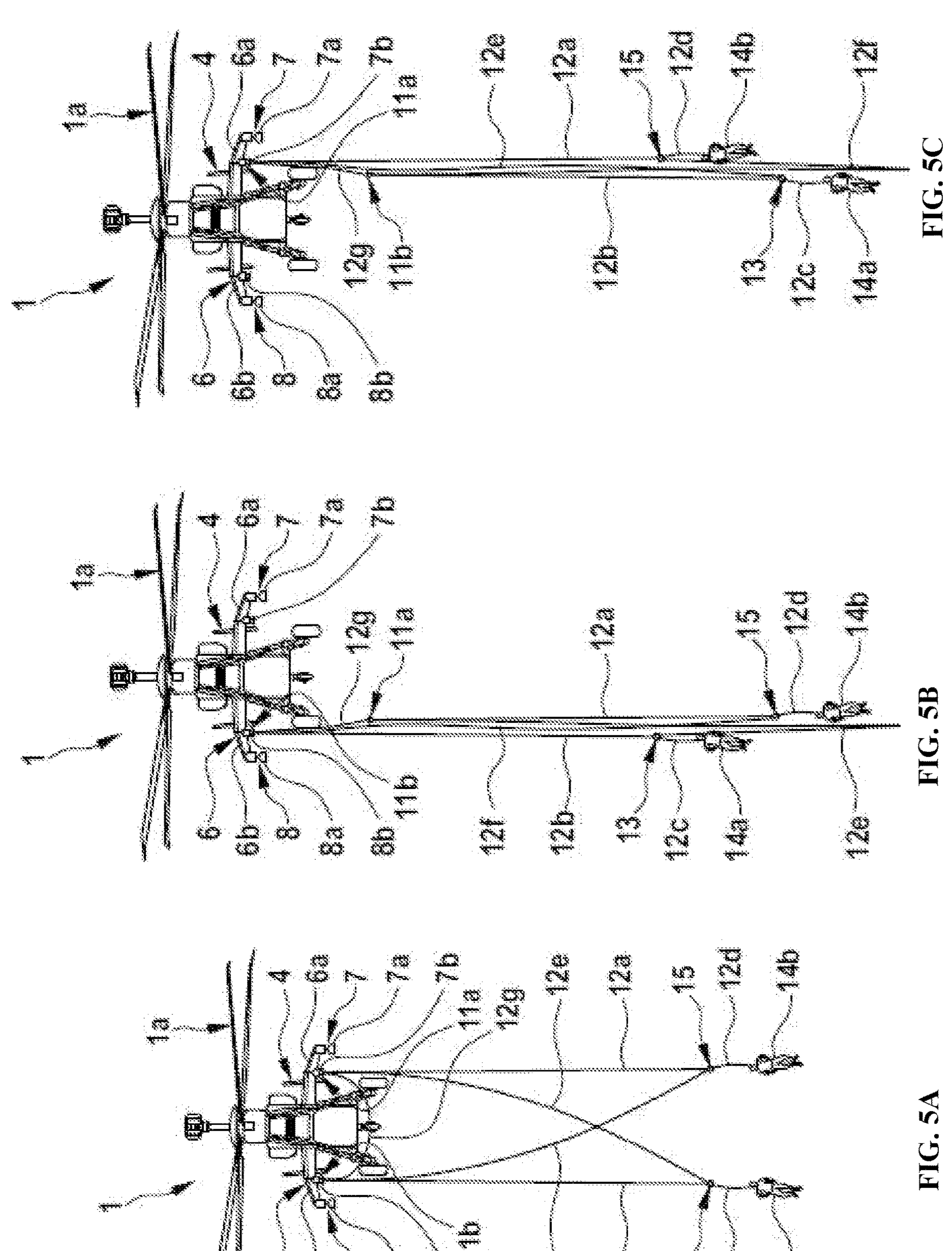

FIG. 5 shows in parts (A) to (C) a variant of the human external cargo transportation system of FIG. 4, which comprises the attack helicopter 1 and the human external cargo transportation arrangement of FIG. 4. However, the human external cargo transportation arrangement now comprises in addition to the external cargo adapters 11*a*, 11*b*, the connecting ropes 12*a*, 12*b*, the swivel 13, and the human external cargo attachment ropes 12*c*, 12*d* two redundant ropes and a safety rope. Moreover, two separate swivels are provided instead of the single common swivel 13 of FIG. 4.

More specifically, according to part (A) the connecting rope 12*a* is now attached to a first swivel 15 and the connecting rope 12*b* is now attached to a second swivel, e.g. the swivel 13 of FIG. 4. Illustratively, the swivel 15 is further attached to a first redundant rope 12*f* that is also attached to the external cargo adapter 11*b*, and the swivel 13 is further attached to a second redundant rope 12*e* that is also attached to the external cargo adapter 11*a*. Furthermore, a safety rope 12*g* is attached to both external cargo adapters 11*a*, 11*b* and, thus, connects the external cargo adapter 11*a* with the external cargo adapter 11*b*. Moreover, the human external cargo attachment rope 12*c* is attached to the swivel 13 and the human external cargo attachment rope 12*d* is attached to the swivel 15. The first person 14*a* is attached as human external cargo to the human external cargo attachment rope 12*c* and the second person 14*b* is attached as human external cargo to the human external cargo attachment rope 12*d*.

In part (A) of FIG. 5, the human external cargo transportation system is shown in normal operation mode during flight of the attack helicopter 1. Accordingly, both external cargo adapters 11*a*, 11*b* are correctly attached to the sub wing carrier stations 7*b*, 8*b*, and the sub wing carrier stations 7*a*, 8*a* are kept free and may, for instance, still be used for transportation of weapons, ammunition, or additional fuel tanks.

Part (B) shows a scenario, in which the external cargo adapter 11*a* is accidentally or intentionally released from the sub wing carrier station 7*b*. In this scenario, the external cargo adapter 11*a* falls down by gravity as far as the safety rope 12*g* allows, but is not lost and, instead, still attached to the external cargo adapter 11*b* via the safety rope 12*g*. In particular, the first person 14*a* is still attached via the human external cargo attachment rope 12*c*, the swivel 13, the connecting rope 12*b*, and the external cargo adapter 11*b* to the sub wing carrier station 8*b*, and the second person 14*b* is still attached via the human external cargo attachment rope 12*d*, the swivel 15, the redundant rope 12*f*, and the external cargo adapter 11*b* to the sub wing carrier station 8*b*, so that a further safe transportation of both persons 14*a*, 14*b* is guaranteed.

Part (C), in turn, shows a scenario, in which the external cargo adapter 11*b* is accidentally or intentionally released from the sub wing carrier station 8*b*. In this scenario, the external cargo adapter 11*b* falls down by gravity as far as the safety rope 12*g* allows, but is not lost and, instead, still attached to the external cargo adapter 11*a* via the safety rope 12*g*. In particular, the first person 14*a* is still attached via the human external cargo attachment rope 12*c*, the swivel 13, the redundant rope 12*e*, and the external cargo adapter 11*a* to the sub wing carrier station 7*b*, and the second person 14*b* is still attached via the human external cargo attachment rope 12*d*, the swivel 15, the connecting rope 12*a*, and the external cargo adapter 11*a* to the sub wing carrier station 7*b*, so that a further safe transportation of both persons 14*a*, 14*b* is guaranteed.

Figures 6A, 6B, 6C:
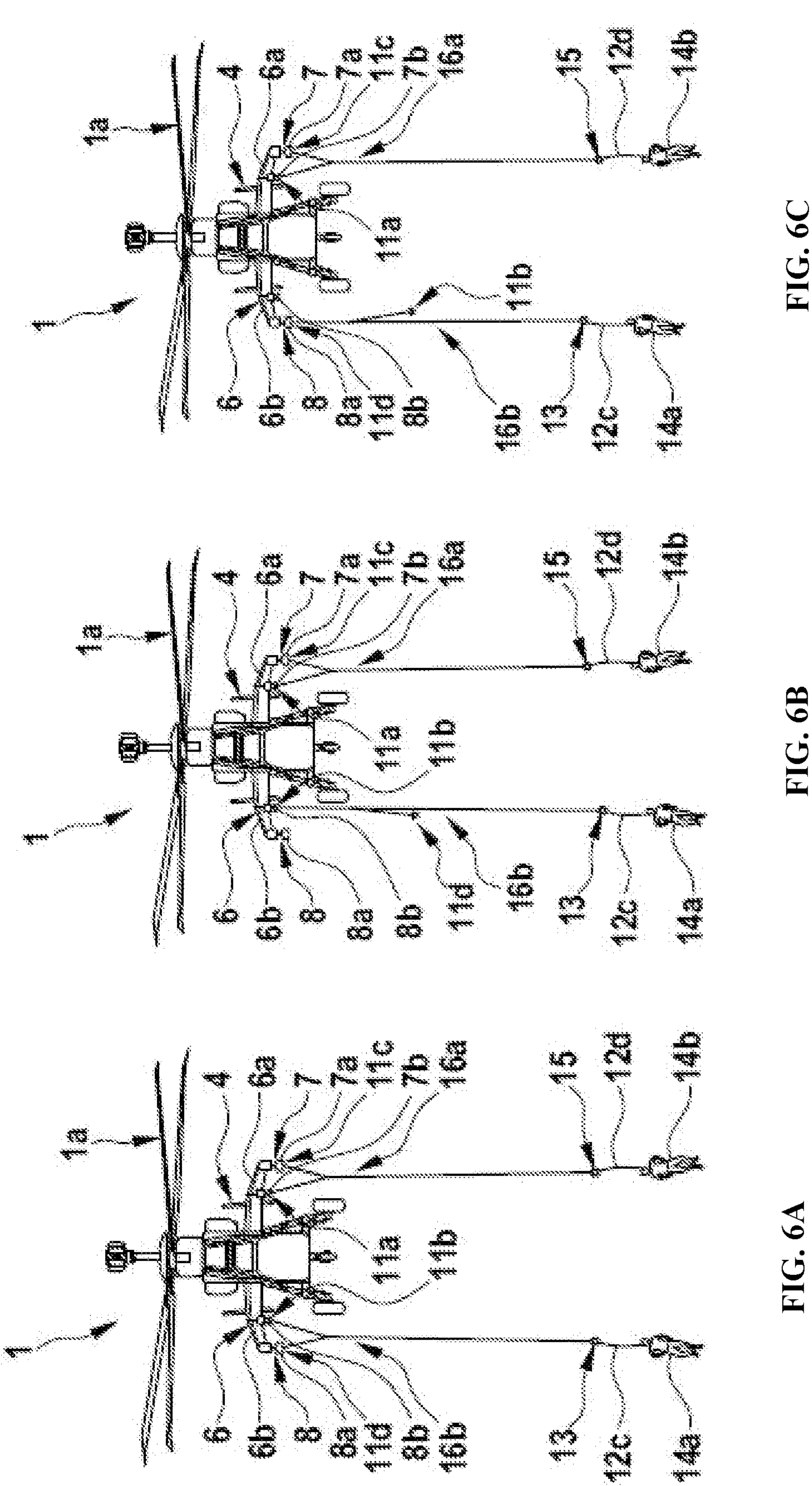

FIG. 6 shows in parts (A) to (C) another variant of the human external cargo transportation system of FIG. 4, which comprises the attack helicopter 1 with the four sub wing carrier stations 7*a*, 7*b*, 8*a*, 8*b* of FIG. 4, and the human external cargo transportation arrangement of FIG. 4. However, the human external cargo transportation arrangement now comprises two so-called Y-ropes 16*a*, 16*b* instead of the connecting ropes 12*a*, 12*b* of FIG. 4 and two separate swivels are provided instead of the single common swivel 13 of FIG. 4. However, such Y-ropes are well-known to the person skilled in the art so that a detailed description thereof can be omitted, for brevity and conciseness. Furthermore, two additional external cargo adapters 11*c*, 11*d* are provided. Each one of the two additional external cargo adapters 11*c*, 11*d* is preferably embodied in accordance with the external cargo adapter 10 of FIG. 3.

More specifically, according to part (A) the Y-rope 16*a* is attached to a first swivel, e.g. the swivel 15 of FIG. 5, and the Y-rope 16*b* is attached to a second swivel, e.g. the swivel 13 of FIG. 4. Illustratively, the two upper branches of the Y-rope 16*a*, which may have different lengths, are attached via the external cargo adapters 11*a*, 11*c* to the sub wing carrier stations 7*b*, 7*a*, respectively. Likewise, the two upper branches of the Y-rope 16*b*, which may also have different lengths, are attached via the external cargo adapters 11*b*, 11*d* to the sub wing carrier stations 8*b*, 8*a*, respectively.

Furthermore, similar to FIG. 5 the human external cargo attachment rope 12*c* is attached to the swivel 13 and the human external cargo attachment rope 12*d* is attached to the swivel 15. The first person 14*a* is attached as human external cargo to the human external cargo attachment rope 12*c* and the second person 14*b* is attached as human external cargo to the human external cargo attachment rope 12*d*.

In part (A) of FIG. 6, the human external cargo transportation system is shown in normal operation mode during flight of the attack helicopter 1. Accordingly, all four external cargo adapters 11*a*, 11*b*, 11*c*, 11*d* are correctly attached to the sub wing carrier stations 7*b*, 8*b*, 7*a*, 8*a*.

Part (B) shows a scenario, in which the external cargo adapter 11*d* is accidentally or intentionally released from the sub wing carrier station 8*a*. In this scenario, the external cargo adapter 11*d* falls down by gravity as far as the respective branch of the Y-rope 16*b* allows, but is not lost and, instead, still attached to the external cargo adapter 11*b* via the Y-rope 16*b*. In particular, the first person 14*a* is still attached via the human external cargo attachment rope 12*c*, the swivel 13, the Y-rope 16*b*, and the external cargo adapter 11*b* to the sub wing carrier station 8*b*, so that a further safe transportation of the first person 14*a* is guaranteed.

Part (C), in turn, shows a scenario, in which the external cargo adapter 11*b* is accidentally or intentionally released from the sub wing carrier station 8*b*. In this scenario, the external cargo adapter 11*b* falls down by gravity as far as the respective branch of the Y-rope 16*b* allows, but is not lost and, instead, still attached to the external cargo adapter 11*d* via the Y-rope 16*b*. In particular, the first person 14*a* is still attached via the human external cargo attachment rope 12*c*, the swivel 13, the Y-rope 16*b*, and the external cargo adapter 11*d* to the sub wing carrier station 8*a*, so that a further safe transportation of the first person 14*a* is guaranteed.

REFERENCE LIST

1 rotorcraft
1*a* main rotor
1*b*, 1*c* rotor blades
1*d* rotor head
1*e*, 1*f* engines
2 fuselage
2*a* cockpit
3 counter-torque device
3*a* tail rotor
4 horizontal stabilizer
5 wheel-type landing gear
6 stub wing arrangement
6*a* left-hand side stub wing
6*b* right-hand side stub wing
7, 8 carrier stations
7*a*, 8*a* outboard sub wing carrier stations
7*b*, 8*b* inboard sub wing carrier stations
7*c*, 7*d* carrier station hooks or bars
9*a* stub wing outboard section
9*b* stub wing inboard section
10 human and/or non-human external cargo adapter
10*a*, 10*b* mounting lugs
10*c*, 10*d* mounting lug openings
10*e* connecting member
10*f* cargo carrying ring
10*g* swivel
10*h* adapter rail upper side
10*i* adapter rail lower side
10*j* adapter rail
11*a*, 11*b*, 11*c*, 11*d* individual adapters
12*a*, 12*b* connecting ropes
12*c*, 12*d* attachment ropes
12*e*, 12*f* redundant ropes
12*g* safety rope
13, 15 swivels
14*a*, 14*b* human external cargo
16*a*, 16*b* Y-ropes

What is claimed is:

1. An external cargo adapter for use with a rotorcraft having a wing arrangement with at least one left-hand side wing and one right-hand side wing, wherein the wing arrangement has at least one weapon station, the external cargo adapter comprising:

a pair of mounting lugs spaced apart and configured to be removably attachable to the at least one weapon station along an exterior of the rotorcraft;

a connecting rail extending between and connecting the pair of mounting lugs; and at least one cargo ring configured to be connected to connected to a connecting rope for transport of an external cargo, wherein the at least one cargo ring is mounted to the connecting rail via a swivel.

2. The external cargo adapter of claim 1 further comprising:

a connecting member that connects at least one of the pair of mounting lugs with the at least one cargo ring.

3. The external cargo adapter of claim 1, wherein at least one of the pair of mounting lugs comprises an associated lug opening configured for receiving a blocking hook or bar of the at least one weapon station.

4. The external cargo adapter of claim 1, wherein the pair of mounting lugs comprises a first mounting lug and a second mounting lug which are spaced apart from each other on the connecting rail.

5. The external cargo adapter of claim 4, wherein the first and second mounting lugs and the swivel are mounted to opposite sides of the connecting rail.

6. A human external cargo transportation system, comprising:

a rotorcraft with at least one weapon station; and a human external cargo transportation arrangement according to claim 1.

7. The human external cargo transportation system of claim 6, wherein the rotorcraft comprises a wing arrangement with at least one left-hand side wing and one right-hand side wing; wherein the left-hand side wing comprises at least the first weapon station; and wherein the right-hand side wing comprises at least the second weapon station.

8. The human external cargo transportation system of claim 7, wherein the wing arrangement is a stub wing arrangement, and wherein the left-hand side wing and the right-hand side wing are stub wings.

9. The human external cargo transportation system of claim 6, wherein the rotorcraft is an attack helicopter.

10. The external cargo adapter of claim 1, wherein each of the pair of mounting lugs comprises a lug opening configured for receiving a blocking hook or bar of the at least one weapon station.

11. The external cargo adapter of claim 1, wherein each of the pair of mounting lugs and the at least one cargo ring are mounted to opposite sides of the connecting rail.

12. A human external cargo transportation arrangement for use with a rotorcraft that comprises at least a first weapon station and a second weapon station, comprising:

a first external cargo adapter for attachment to the first weapon station;

a second external cargo adapter for attachment to the second weapon station;

the first and second external cargo adapters including the external cargo adapter of claim 1;

a first connecting rope for connection to the first external cargo adapter; and a second connecting rope for connection to the second external cargo adapter;

wherein each one of the first and second connecting ropes is connected to at least one additional swivel for connection to at least one first human external cargo attachment rope and one second human external cargo attachment rope.

13. The human external cargo transportation arrangement of claim 12, wherein the first and second connecting ropes are connected to a single one of the at least one additional swivel that attaches the first connecting rope to the second connecting rope.

14. The human external cargo transportation arrangement of claim 12, wherein the at least one additional swivel comprises a first swivel and a second swivel, wherein the first connecting rope is connected to the first swivel for connection to the second human external cargo attachment rope; wherein the second connecting rope is connected to the second swivel for connection to the first human external cargo attachment rope.

15. The human external cargo transportation arrangement of claim 14, wherein the first swivel is further connected to a first redundant rope provided for connection to the second external cargo adapter; and wherein the second swivel is further connected to a second redundant rope provided for connection to the first external cargo adapter.

16. The human external cargo transportation arrangement of claim 12, further comprising a safety rope for connection of the first external cargo adapter with the second external cargo adapter.

17. The human external cargo transportation arrangement of claim 12, further comprising a third external cargo adapter for attachment to a third weapon station of the rotorcraft; and a fourth external cargo adapter for attachment to a fourth weapon station of the rotorcraft;

wherein the first connecting rope is a first Y-rope for connection to the first external cargo adapter and the third external cargo adapter; and wherein the second connecting rope is a second Y-rope for connection to the second external cargo adapter and the fourth external cargo adapter.

* * * * *